US012781088B2

(12) United States Patent
Jee

(10) Patent No.: US 12,781,088 B2
(45) Date of Patent: Nov. 3, 2026

(54) SEALER COMPOSITION FOR COATING FILM WITH IMPROVED APPEARANCE QUALITY

(71) Applicants: Hyundai Motor Company, Seoul (KR); Kia Corporation, Seoul (KR)

(72) Inventor: In Eui Jee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 576 days.

(21) Appl. No.: 17/883,130

(22) Filed: Aug. 8, 2022

(65) Prior Publication Data

US 2023/0059631 A1 Feb. 23, 2023

(30) Foreign Application Priority Data

Aug. 13, 2021 (KR) ........................ 10-2021-0107034

(51) Int. Cl.

| | |
|---|---|
| ***C09D 175/08*** | (2006.01) |
| ***C08G 18/24*** | (2006.01) |
| ***C08G 18/40*** | (2006.01) |
| ***C08G 18/42*** | (2006.01) |
| ***C08G 18/48*** | (2006.01) |
| ***C08K 3/26*** | (2006.01) |
| ***C09D 7/20*** | (2018.01) |
| ***C09D 7/61*** | (2018.01) |
| ***C09D 7/65*** | (2018.01) |

(52) U.S. Cl.

CPC ......... *C09D 175/08* (2013.01); *C08G 18/246* (2013.01); *C08G 18/4018* (2013.01); *C08G 18/42* (2013.01); *C08G 18/4829* (2013.01); *C08K 3/26* (2013.01); *C09D 7/20* (2018.01); *C09D 7/61* (2018.01); *C09D 7/65* (2018.01); *C08K 2003/265* (2013.01)

(58) Field of Classification Search

CPC .......... C09D 175/08; C09D 7/20; C09D 7/61; C09D 7/65; C09D 5/34; C09D 175/04; C09D 7/40; C09D 175/06; C08G 18/246; C08G 18/4018; C08G 18/42; C08G 18/4829; C08G 2190/00; C08G 18/4238; C08G 18/4825; C08G 18/80; C08K 3/26; C08K 2003/265; C08K 3/013; C08K 2003/267

See application file for complete search history.

(56) References Cited

U.S. PATENT DOCUMENTS

| | | | | |
|---|---|---|---|---|
| 5,574,102 | A * | 11/1996 | Tanigami | C08L 33/04 528/80 |
| 2012/0128991 | A1* | 5/2012 | Kollbach | B32B 27/32 156/331.7 |
| 2020/0248053 | A1* | 8/2020 | Li | C08G 18/3206 |
| 2020/0283639 | A1* | 9/2020 | Nishioka | C09D 5/02 |
| 2021/0071030 | A1* | 3/2021 | Mano | C08G 18/6229 |

FOREIGN PATENT DOCUMENTS

| | | | |
|---|---|---|---|
| JP | 03203974 | A * | 9/1991 |
| JP | H1171552 | A | 3/1999 |
| JP | 2006116450 | A | 5/2006 |
| JP | 2012121984 | A | 6/2012 |
| JP | 5388405 | B2 * | 1/2014 |
| JP | 2021505739 | A | 2/2021 |
| KR | 20010085299 | A | 9/2001 |
| KR | 101755840 | B1 | 7/2017 |

OTHER PUBLICATIONS

Shinichiro, JP5388405-MT (Year: 2014).*
Matsunaga, JP03203974-MT (Year: 1991).*

* cited by examiner

*Primary Examiner* — Robert S Jones, Jr.
*Assistant Examiner* — Zhen Liu
(74) *Attorney, Agent, or Firm* — Fox Rothschild LLP

(57) ABSTRACT

Disclosed are a sealer composition and a coating film with improved appearance quality. The sealer composition for a coating film includes a polyol mixture containing a polyester polyol and a polyether polyol in a predetermined ratio, an isocyanate compound including a blocked isocyanate, and a curing catalyst and the coating film prepared from the sealer composition has improved appearance quality as well as improved abrasion resistance.

8 Claims, No Drawings

SEALER COMPOSITION FOR COATING FILM WITH IMPROVED APPEARANCE QUALITY

CROSS-REFERENCE TO RELATED APPLICATION

This application claims under 35 U.S.C. § 119(a) the benefit of priority to Korean Patent Application No. 10-2021-0107034, filed on Aug. 13, 2021, the entire contents of which are incorporated herein by reference.

TECHNICAL FIELD

The present invention relates to a sealer composition and a coating film manufacture from the same. The sealer composition for a coating film includes a polyol mixture including a polyester polyol and a polyether polyol, an isocyanate compound including a blocked isocyanate, and a curing catalyst. The coating film prepared using the sealer composition has improved appearance quality as well as improved abrasion resistance.

BACKGROUND

A sealer has been applied to a side seal of a vehicle to protect a vehicle body from stones or foreign substances sticking out of the ground. After electrodeposition, a rocker panel primer (RPP) formed of PVC also has been applied to form a coating film to protect the adherend surface and improve rust resistance.

As the shape of a vehicle changes, the demand for abrasion resistance for the region ranging from the lower part of the rear door to the upper part of the seal side is gradually increasing compared to the prior art.

However, the corresponding part is easily visible from the outside and the PVC RPP that has been applied to the prior art has problems of deteriorating overall vehicle appearance quality due to rough texture and unevenness of an exterior surface of the finished coating film when the PVC RPP is applied to the region ranging from the lower part of the rear door to the upper part of the seal side.

In the related art, a body sealer composition has been reported, which contains polyvinyl chloride (PVC). However, a coating film produced using such sealer composition has a problem in that the surface texture is rough.

In order to secure the surface quality of the finished coating film in consideration of the above problems, a sealer containing a polyurethane resin was applied along with a solvent to obtain excellent external surface quality, but this sealer had a limit to application to the RPP-based part due to the characteristics of the material. In particular, the conventional polyurethane-based sealer was very vulnerable to external impact because it was mainly used to fill the gaps between the steel plates of the vehicle body, and was used to secure watertightness of the vehicle body based on relatively low strength and high elongation. Therefore, when a polyurethane-based sealer is applied to RPP parts to which external impact is often applied, when chipping (impact by stones) occurs in a driving vehicle, there are serious problems of chipping marks and damage to the coating film.

The above information disclosed in this section is only for enhancement of understanding of the background of the invention, and therefore it may contain information that does not form the prior art that is already known in this country to a person of ordinary skill in the art.

SUMMARY

In preferred aspects, provided are a sealer composition and a coating film prepared using the same. The coating film nay have improved external surface quality as well as improved resistance to external impact. In particular, the sealer composition for a coating film may be used to improve process efficiency and reduce cost by replacing a conventional anti-chipping film for vehicles.

The objects of the present invention are not limited to those described above. Other objects of the present invention will be clearly understood from the following description, and are able to be implemented by means defined in the claims and combinations thereof.

In an aspect, provided is a sealer including a polyol mixture, an isocyanate compound, a curing catalyst, a filler, and a solvent. The polyol mixture may include a polyester polyol and a polyether polyol, and the isocyanate compound may include a blocked isocyanate.

The polyester polyol may include one or more selected from the group consisting of polyethylene adipate polyol, polybutylene adipate polyol, polyethylene butylene adipate polyol, and poly(3-methylpentylene adipate) polyol.

The polyester polyol may have 2 to 4 functional groups.

The polyether polyol may include polyethylene glycol, polypropylene glycol, and combinations thereof.

The polyether polyol may have 2 to 3 functional groups.

The isocyanate compound may include one or more selected from the group consisting of hexamethylene diisocyanate, isophorone diisocyanate, and 4,4-dihexylmethane diisocyanate.

The curing catalyst may include dibutyl tin dilaurate.

The filler may include calcium carbonate, and the solvent may include ethyl acetate.

The sealer composition may further include an additive.

The additive may include a defoaming agent including a polyoxyethylene polyoxypropylene surfactant, a colorant including carbon black, or combinations thereof.

The sealer composition may suitably include an amount of about 15 to 40% by weight of the polyol mixture, an amount of about 25 to 35% by weight of the isocyanate compound, an amount of about 0.5 to 1.0% by weight of the curing catalyst, an amount of about 15 to 25% by weight of the filler, and an amount of about 15 to 25% by weight of the solvent, based on the total weight of the sealer composition.

The sealer composition may suitably include an amount of about 15 to 40% by weight of the polyol mixture, an amount of about 15 to 40% by weight of the polyol mixture, an amount of about 25 to 35% by weight of the isocyanate compound, an amount of about 0.5 to 1.0% by weight of the curing catalyst, an amount of about 15 to 25% by weight of the filler, an amount of about 15 to 25% by weight of the solvent, and an amount of about 0.1 to 3.0% by weight of the additive, based on the total weight of the sealer composition.

The sealer composition may suitably include an amount of about 10 to 25% by weight of the polyester polyol and an amount of about 5 to 15% by weight of the polyether polyol, based on the total weight of the sealer composition.

The sealer composition may suitably include an amount of about 12 to 25% by weight of the polyester polyol, an amount of about 7 to 12% by weight of the polyether polyol, an amount of about 25 to 33% by weight of the isocyanate compound, an amount of about 0.5 to 1.0% by weight of the curing catalyst, an amount of about 19.5 to 20% by weight of the filler, and an amount of about 15 to 25% by weight of the solvent, based on the total weight of the sealer composition.

In another aspect, provided is a coating film prepared from the sealer composition as described herein.

Also provided is a vehicle including the coating film as described herein.

Other aspects of the invention are discussed infra.

DETAILED DESCRIPTION

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range.

In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Sealer Composition for Coating Film

Provided is a sealer composition for a coating film having improved appearance quality. The sealer composition for a coating film may include a polyol mixture, an isocyanate compound, a curing catalyst, a filler, and a solvent.

Hereinafter, each component included in the sealer composition will be described.

Polyol Mixture

The polyol mixture may include a polyester polyol and a polyether polyol.

The polyester polyol may impart strength, chemical resistance, or the like to the coating film and preferably may include one or more selected from the group consisting of polyethylene adipate polyol, polybutylene adipate polyol, polyethylene butylene adipate polyol, and poly(3-methylpentylene adipate) polyol.

The polyester polyol preferably has 2 to 4 functional groups. When the number of functional groups of the polyester polyol exceeds four, there may occur a problem in that the elongation of the coating film is lowered due to hardening.

Suitable polyester polyols for use in the present compositions and system may have a wide range of molecular weights. For suitable molecular weights of a suitable polyester polyol may be 200 to 10,000 daltons or more, more typically up to or more than 200, 300, 400, 500, 600, 700, 800, 900, 100, 15,00, 200, 2500, 3000, 3500, 4000, 4500, 5000 or more.

Exemplary suitable polyester polyols for use in the present compositions and systems include HP1020 (polyester diol (MW 2000)) supplied by Heung-il Polychem. Other suitable polyester polyols for use in the present compositions may be readily prepared and/or are commercially available.

The polyether polyol may impart water resistance, hydrolysis resistance, or the like to the coating film, and preferably may include polyethylene glycol, polypropylene glycol, and combinations thereof.

The polyether polyol preferably may have 2 to 3 functional groups.

Suitable polyether polyols for use in the present compositions and system may have a wide range of molecular weights. For suitable molecular weights of a suitable polyester polyol may be 200 to 10,000 daltons or more, more typically up to or more than 200, 300, 400, 500, 600, 700, 800, 900, 100, 15,00, 200, 2500, 3000, 3500, 4000, 4500, 5000 or more. In certain aspects, a polyether diol may be preferred.

PPG-1000D supplied by Kumho Petrochemical is a polyether diol (polypropylene glycol) and has a molecular weight of 1000 and a viscosity at 25° C. of 135-165 cps; Voranol 2110-TB supplied by Dow which is a polyether diol and has a molecular weight of 2000; and Polyglykol A 500 supplied by Clariant (polyethylene glycol monoallyl ether) and has a molecular weight of 500. Other suitable polyether polyols for use in the present compositions may be readily prepared and/or are commercially available.

The sealer composition of the present invention may suitably include an amount of about 15 to 40% by weight of the polyol mixture based on the total weight of the sealer composition. The sealer composition may suitably include an amount of about 10 to 25% by weight of the polyester polyol and an amount of about 5 to 15% by weight of the polyether polyol. Preferably, the sealer composition may include an amount of about 12 to 25% by weight of the polyester polyol and an amount of about 7 to 12% by weight of the polyether polyol. When the content of the polyester polyol is less than about 10% by weight, the desired physical properties may not be obtained, and when the content of the polyester polyol is greater than about 25% by weight, the efficiency may be insufficient compared to the amount of the curing agent that is added. In addition, when the content of the polyether polyol is less than about 5% by weight, water resistance may decrease, and when the content of the polyether polyol is greater than about 15% by weight, the elongation may be excessively high, and traces may be left on the coating film during chipping.

Isocyanate Compound

The isocyanate compound may include one or more of an aliphatic isocyanate compound, an aromatic isocyanate compound, or combinations thereof. The aliphatic isocyanate compound may be used to impart weather resistance to the coating film.

In particular, the isocyanate compound may suitably include a blocked isocyanate which is obtained by reacting an isocyanate with an organic or inorganic substance to remarkably reduce reactivity at a certain temperature or less.

The blocked isocyanate may suitably include one or more selected from the group consisting of hexamethylene diisocyanate, isophorone diisocyanate, and 4,4-dihexylmethane diisocyanate.

A variety of isocyanate compounds maybe suitably used in the present compositions and systems, including polyisocyanates.

Exemplary suitable isocyanate materials include D-660 (polyisocyanate; supplied by Aekyung Chemical) and AH-1075EA (polyisocyanate; supplied by Aekyung Chemical). Other suitable isocyanate compounds for use in the present compositions may be readily prepared and/or are commercially available.

The sealer composition may suitably include an amount of about 25 to 35% by weight, or particularly an amount of about 25 to 33% by weight, of the isocyanate compound, based on the total weight of the sealer composition. When the content of the isocyanate compound is less than about 25% by weight, curing may not proceed as much as desired and the strength of the coating film may decrease. When the content of the isocyanate compound is greater than about 35% by weight, the obtained effect may be insufficient compared to the increased isocyanate content and the physical properties of the coating film may be remarkably deteriorated due to residual isocyanate.

Curing Catalyst

The curing catalyst may improve the strength of the coating film, and the curing catalyst preferably may include dibutyl tin dilaurate, which is an organotin catalyst.

The sealer composition may suitably include an amount of about 0.5 to 1.0% by weight of the curing catalyst based on the total weight of the sealer composition, When the content of the curing catalyst is less than about 0.5% by weight, curing may be insufficient and the strength of the coating film may be insufficient, and when the content of the curing catalyst is greater than about 1.0% by weight, curing may be excessive and thus the strength and elongation of the coating film may be reduced.

Filler

The filler may improve workability and provide filling property, and the filler preferably may include calcium carbonate. Particular, the filler may include calcium carbonate coated with fatty acid.

The sealer composition may include an amount of about 15 to 25% by weight, or particularly an amount of about 19.5 to 20% by weight of the filler based on the total weight of the sealer composition. When the content of the filler is less than about 15% by weight, ejection property may not be sufficient and when the content of the filler is greater than about 25% by weight, mechanical strength and workability may not be sufficient.

Solvent

The solvent may control the viscosity of the sealer and provide workability, and the solvent preferably may include ethyl acetate.

The sealer composition may suitably include an amount of about 15 to 25% by weight of the solvent based on the total weight of the sealer composition. When the content of the solvent is less than about 15% by weight, ejection property may not be sufficient due to high viscosity, and when the content of the solvent is greater than 25% by weight, problems such as decreased flow, adhesion failure, and strength may occur due to the decreased viscosity.

Additive

The sealer composition may further include an additive.

The additive may suitably include one or more selected from an antifoaming agent and a colorant, and preferably may include an antifoaming agent including a polyoxyethylene polyoxypropylene-based surfactant, a colorant including carbon black, and combinations thereof.

The sealer composition may suitably include an amount of about 0.1 to 3.0% by weight of the additive based on the total weight of the sealer composition. In particular, the antifoaming agent may be present in an amount of about 0.1 to 1.0% by weight additive based on the total weight of the sealer composition. When the content of the antifoaming agent is less than about 0.1% by weight, defoaming properties may be deteriorated, and when the content of the antifoaming agent is greater than about 1.0% by weight, the stability may be deteriorated.

EXAMPLE

Hereinafter, the present invention will be described in more detail with reference to specific examples. However, the following examples are provided only for better understanding of the present invention, and thus should not be construed as limiting the scope of the present invention.

Production Example

Ingredients

- Polyester polyol: HP1020 (Heung-il Polychem)
- Polyether polyol: PPG-1000 (Kumho Petrochemical)
- Isocyanate compound: D-660 (Aekyung Chemical)
- Curing catalyst: Dibutyltin dilaurate
- Filler: calcium carbonate having average particle size of 10 to 20 μm
- Solvent: Ethyl acetate Antifoaming agent: Polyoxyethylene polyoxypropylene surfactant Colorant: Carbon black Examples 1 to 5, and Comparative Examples 1 to 4

A polyester polyol, a polyether polyol, and an isocyanate compound were used in amounts shown in Table 1 below and were allowed to react with one another at a temperature of 95° C. for 2 to 3 hours to prepare polyurethane having a solid content of about 60%. The polyurethane was mixed with a curing catalyst, a filler, a solvent, an antifoaming agent and a colorant, and then stirred at a temperature of 40° C. for 2 to 3 hours to prepare a sealer composition.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| A | 15 | 15 | 12 | 18 | 2 | 15 | 15 | 30 | 4 |
| B | 10 | 10 | 12 | 9 | 7 | 10 | 10 | 2 | 20 |
| C | 32 | 32 | 33 | 30 | 25 | 32 | 32 | 25 | 40 |
| D | 0.5 | 1.0 | 1 | 1 | 1 | 0 | 1.5 | 1 | 1 |
| E | 20 | 19.5 | 20 | 20 | 20 | 20.5 | 19.5 | 20 | 20 |
| F | 20 | 20 | 20 | 20 | 20 | 20 | 20 | 20 | 20 |
| G | 0.5 | 0.5 | 0.5 | 0.5 | 0.5 | 0.5 | 0.5 | 0.5 | 0.5 |
| H | 1.5 | 1.5 | 1.5 | 1.5 | 1.5 | 1.5 | 1.5 | 1.5 | 1.5 |

A: Polyester polyol
B: Polyether polyol
C: Isocyanate compound
D: Curing catalyst
E: Solvent
F: Filler
G: Defoaming agent
H: Colorant Experimental Example Steel sheets were subjected to pretreatment and electrodeposition, and sealer compositions prepared in Examples and Comparative Examples were applied thereto to a thickness of about 80 μm and were then cured to form coating films, and then the physical properties of respective coating films were measured using the following measurement method, and the results are shown in the following Table 2.

TABLE 2

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Tensile strength | 3.4 | 3.6 | 3.8 | 3.2 | 2.7 | 1.2 | 3.2 | 2.6 | 4.9 |
| Elongation | 82% | 70% | 71% | 85% | 96% | 80% | 40% | 110% | 37% |
| Appearance quality | Good | Good | Good | Good | Good | Good | Good | Good | Good |
| Adhesiveness | M-1.0 (Good) | M-1.0 (Good) | M-1.0 (Good) | M-1.0 (Good) | M-1.0 (Good) | M-1.0 (Good) | M-2.0 (Bad) | M-1.0 (Good) | M-1.0 (Good) |
| Hardness | HB | HB | HB | HB | B | 2B | F | 2B | HB |
| Chipping resistance | 3 | 4 | 4 | 3 | 5 | 12 | 15 | 12 | 13 |

Measurement Method

Tensile strength and elongation: the prepared sealer compositions were applied to sheets, cured at a temperature of 140° C. for 20 minutes, and then punched into a JIS No. 3 dumbbell test specimens, and the specimens were hung on a tensile tester and tested at a rate of 300 mm/min.

Appearance quality: whether or not there are abnormalities such as wrinkles and air bubbles compared to the part to which the sealer composition was not applied was determined.

Adhesiveness: about 100 of 2-mm cross-cuts were created and whether or not detachment occurred after peeling off using a tape was determined.

Hardness: Mitsubishi pencil hardness

Chipping resistance: the coating film specimen formed by applying the sealer composition was left at a temperature of −20° C. for 3 hours and then was tested using 50 g of a prepared zeolite (2.5-5 mm) at a pressure of 5 kgf/cm, and then the appearance of the specimen was observed.

The results of Examples 1 to 5 showed that, as the content ratio of the polyester polyol to the polyether polyol increases, the tensile strength of the material is reduced and the elongation is increased.

The curing catalyst, which was added in an amount of 0.5 to 1.0%, caused improved tensile strength compared to Comparative Example 1, and the result of the evaluation of the chipping resistance showed that chipping traces were excessive. Comparative Example 2, which was excessively hardened due to the excessively added curing catalyst, exhibited a decreased elongation without improvement in tensile strength, compared to Examples 1 and 2, and exhibited a decreased adhesion, allowing the coating film to be easily detached due to chipping in the evaluation of chipping resistance, compared to Examples 1 to 5.

In Comparative Example 3, in which the polyether polyol was added in a small amount less than 5% by weight, the coating film was seriously damaged due to an insufficient increase in tensile strength and thus high elongation. On the other hand, in Comparative Example 4 in which the content of polyether polyol was 18% by weight or greater, the increase in tensile strength was excessive and there was almost no elongation, so the coating film was easily detached when chipping occurred. On the other hand, Examples 1 to 5 using a mixture of 10 to 25% by weight of a polyester polyol with 5 to 15% by weight of a polyether polyol satisfied all of the required physical properties.

According to various exemplary embodiments of the present invention, the sealer composition can provide a coating film that has improved external surface quality as well as improved resistance to external impact.

Moreover, according to various exemplary embodiments of the present invention, the sealer composition for a coating film can improve process efficiency and reduce cost by replacing a conventional anti-chipping film for vehicles.

The effects of the present invention are not limited to those mentioned above. It should be understood that the effects of the present invention include all effects that can be inferred from the description of the present invention.

The present invention has been described in detail with reference to exemplary embodiments thereof. However, it will be appreciated by those skilled in the art that changes may be made in the embodiments without departing from the principles and spirit of the present invention, the scope of which is defined in the appended claims and their equivalents.

What is claimed is:

1. A sealer composition comprising:

a polyol mixture;

an isocyanate compound;

a curing catalyst;

a filler; and a solvent, wherein the polyol mixture comprises a polyester polyol and a polyether polyol, and the isocyanate compound comprises a blocked isocyanate, wherein the polyester polyol comprises one or more selected from the group consisting of polyethylene adipate polyol, polybutylene adipate polyol, polyethylene butylene adipate polyol, and poly(3-methylpentylene adipate) polyol, wherein the polyether polyol comprises one or more selected from the group consisting of polyethylene glycol and polypropylene glycol, wherein the sealer composition comprises an amount of about 10 to 25% by weight of the polyester polyol and an amount of about 5 to 15% by weight of the polyether polyol, an amount of about 25 to 35% by weight of the isocyanate compound, an amount of about 0.5 to 1.0% by weight of the curing catalyst, an amount of about 15 to 25% by weight of the filler, and an amount of about 15 to 25% by weight of the solvent, all % by weight based on the total weight of the sealer composition, wherein the curing catalyst consists of dibutyl tin dilaurate.

2. The sealer composition according to claim 1, wherein the isocyanate compound comprises one or more selected from the group consisting of hexamethylene diisocyanate, isophorone diisocyanate, and 4,4-dihexylmethane diisocyanate.

3. The sealer composition according to claim 1, wherein the filler comprises calcium carbonate, and the solvent comprises ethyl acetate.

4. The sealer composition according to claim 1, further comprising an additive.

5. The sealer composition according to claim 4, wherein the additive comprises one or more selected from the group consisting of a defoaming agent comprising a polyoxyethylene polyoxypropylene surfactant and a colorant comprising carbon black.

6. The sealer composition according to claim 4, wherein the sealer composition comprises an amount of about 15 to 40% by weight of the polyol mixture, an amount of about 25 to 35% by weight of the isocyanate compound, an amount of about 0.5 to 1.0% by weight of the curing catalyst, an amount of about 15 to 25% by weight of the filler, an amount of about 15 to 25% by weight of the solvent, and an amount of about 0.1 to 3.0% by weight of the additive, based on the total weight of the sealer composition.

7. The sealer composition according to claim 4, wherein the sealer composition comprises an amount of about 12 to 25% by weight of the polyester polyol, an amount of about 7 to 12% by weight of the polyether polyol, an amount of about 25 to 33% by weight of the isocyanate compound, an amount of about 0.5 to 1.0% by weight of the curing catalyst, an amount of about 19.5 to 20% by weight of the filler, and an amount of about 15 to 25% by weight of the solvent, based on the total weight of the sealer composition.

8. A coating film prepared from a sealer composition according claim 1.

* * * * *